(12) United States Patent
Kena et al.

(10) Patent No.: US 10,843,529 B2
(45) Date of Patent: Nov. 24, 2020

(54) PRESSURE RELIEF VALVE LINKED FOR MOVEMENT WITH SIDE DOOR GLASS

(71) Applicant: FORD GLOBAL TECHNOLOGIES, LLC, Dearborn, MI (US)

(72) Inventors: Mukdam Kena, Sterling Heights, MI (US); Michael Murphy McElroy, South Lyon, MI (US); Mike Norman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/807,716

(22) Filed: Nov. 9, 2017

(65) Prior Publication Data
US 2019/0135081 A1    May 9, 2019

(51) Int. Cl.
| | |
|---|---|
| *B60H 1/24* | (2006.01) |
| *B60J 5/04* | (2006.01) |
| *E05F 15/70* | (2015.01) |
| *B60J 1/17* | (2006.01) |
| *B60R 13/02* | (2006.01) |

(52) U.S. Cl.
CPC ............ *B60H 1/248* (2013.01); *B60J 5/0493* (2013.01); *E05F 15/70* (2015.01); *B60J 1/17* (2013.01); *B60J 5/04* (2013.01); *B60R 13/0243* (2013.01); *E05Y 2900/531* (2013.01); *E05Y 2900/55* (2013.01)

(58) Field of Classification Search
CPC .............................................. B60H 1/248–249
USPC ................... 454/70, 162–163, 306, 903, 354
See application file for complete search history.

(56) References Cited

U.S. PATENT DOCUMENTS

| | | | | |
|---|---|---|---|---|
| 3,538,943 | A | * | 11/1970 | Thomas ................... F16K 17/26 137/493.8 |
| 8,029,343 | B2 | | 10/2011 | Major et al. |
| 9,656,534 | B2 | | 5/2017 | Wade et al. |
| 2012/0133174 | A1 | * | 5/2012 | Syvret ........................ B60J 1/17 296/146.2 |
| 2013/0072101 | A1 | | 3/2013 | Marleau, Jr. et al. |
| 2014/0273784 | A1 | | 9/2014 | Wade et al. |
| 2016/0281870 | A1 | | 9/2016 | Thanedar et al. |
| 2017/0158021 | A1 | * | 6/2017 | Iacovoni ............ B60H 1/00842 |

* cited by examiner

*Primary Examiner* — Vivek K Shirsat
(74) *Attorney, Agent, or Firm* — David Coppiellie; Carlson, Gaskey & Olds, P.C.

(57) ABSTRACT

A system according to an exemplary aspect of the present disclosure includes, among other things, a door having interior and exterior sides, at least one inlet in the interior side, at least one outlet in the exterior side, and a window mechanism to move a window relative to the door. At least one pressure relief valve is in communication with the inlet and outlet, and is mechanically linked for movement with the window. A method according to an exemplary aspect of the present disclosure includes, among other things, mechanically linking at least one pressure relief valve for movement with the window such that the pressure relief valve opens in response to the window beginning to open.

22 Claims, 6 Drawing Sheets

PRESSURE RELIEF VALVE LINKED FOR MOVEMENT WITH SIDE DOOR GLASS

TECHNICAL FIELD

This disclosure relates to a method and system to provide a pressure relief valve that is mechanically linked to side door glass movement to reduce door closing efforts.

BACKGROUND

Vehicles often use air-extractors to influence air flow from a vehicle passenger compartment to enhance passenger comfort and to prevent window fogging. As a climate control system takes in ambient air from outside the vehicle, air exhaustion through the extractors provides for proper circulation and can reduce pressure from building up in the compartment. When a vehicle door is closed, pressure can suddenly rise within the compartment which can result in a high closing effort. Vehicle door closing effort is an important attribute for user satisfaction. If it is too difficult to close a vehicle door, a passenger may become frustrated due to time consuming efforts to close the door when entering and exiting the vehicle.

As door closure effort is directly tied to the in-vehicle air flow rate, it is often difficult to achieve required flow rates to deliver good performance with traditional extractors due to packaging constraints. Typically, two to four air extractors are packaged in a rear portion of the vehicle to deliver the desired flow attributes. Larger air extractor openings allow for adequate air flow but can result in an increase in noise, vibration, and harshness (NVH) performance, which is not desirable. Some NVH solutions use springs to close air extractor flaps until a certain cabin pressure is reached; however, this operation is contrary to climate fogging and door closing efforts. Further, using larger air extractors is also not desired due to packaging constraints.

SUMMARY

A system according to an exemplary aspect of the present disclosure includes, among other things, a door having interior and exterior sides, at least one inlet in the interior side, at least one outlet in the exterior side, and a window mechanism to move a window relative to the door. At least one pressure relief valve is in communication with the inlet and outlet, and is mechanically linked for movement with the window.

In a further non-limiting embodiment of the foregoing system, the pressure relief valve is closed when the window is closed and is opened when the window begins to open to allow air to flow from the inlet to the outlet.

In a further non-limiting embodiment of either of the foregoing systems, the window mechanism automatically lowers the window by a predetermined amount in response to the door being opened.

In a further non-limiting embodiment of any of the foregoing systems, the window mechanism closes the window once the door is closed and the pressure relief valve returns to a closed position.

In a further non-limiting embodiment of any of the foregoing systems, the system includes a gear assembly that couples the window mechanism and/or window to the pressure relief valve.

In a further non-limiting embodiment of any of the foregoing systems, the system includes a cam assembly that couples the window mechanism and/or window to the pressure relief valve.

In a further non-limiting embodiment of any of the foregoing systems, at least one inlet comprises at least one louver or vent hole located in the door trim on the interior side.

In a further non-limiting embodiment of any of the foregoing systems, the system includes a vertically extending J-plane separating the interior and exterior sides, and wherein the inlet is located internally and the outlet is located externally relative to the J-plane.

In a further non-limiting embodiment of any of the foregoing systems, the pressure relief valve is located internally relative to the J-plane.

In a further non-limiting embodiment of any of the foregoing systems, the pressure relief valve comprises a first pressure relief valve and including at least one second pressure relief valve located externally relative to the J-plane and associated with the outlet.

In a further non-limiting embodiment of any of the foregoing systems, the second pressure relief valve is mechanically coupled to the first pressure relief valve.

In a further non-limiting embodiment of any of the foregoing systems, the system includes a seal associated with the outlet.

In a further non-limiting embodiment of any of the foregoing systems, the seal is preloaded to a closed position and moves to an open position in response to an increase in air pressure exiting the pressure relief valve.

In a further non-limiting embodiment of any of the foregoing systems, the at least one pressure relief valve comprises at least a first pressure relief valve associated with the inlet and a second pressure relief valve associated with the outlet, the first and second pressure relief valves being mechanically linked for movement together between open and closed positions.

A method according to another exemplary aspect of the present disclosure includes, among other things: providing a door having interior and exterior sides, a window mechanism to move a window relative to the door, and at least one inlet in the interior side and at least one outlet in the exterior side; and mechanically linking at least one pressure relief valve for movement with the window such that the pressure relief valve opens in response to the window beginning to open.

In a further non-limiting embodiment of the foregoing method, the method includes automatically lowering the window via the window mechanism by a predetermined amount in response to the door being opened which correspondingly opens the pressure relief valve to allow air to flow from the inlet to the outlet.

In a further non-limiting embodiment of either of the foregoing methods, the method includes closing the window via the window mechanism once the door is closed resulting in the pressure relief valve returning to a closed position.

In a further non-limiting embodiment of any of the foregoing methods, the method includes coupling the pressure relief valve to the window mechanism and/or window with a gear or cam assembly.

In a further non-limiting embodiment of any of the foregoing methods, the at least one pressure relief valve comprises at least a first pressure relief valve and a second pressure relief valve, and the method includes associating the first pressure relief valve with the inlet, associating the second pressure relief valve with the outlet, and mechanically linking the first and second pressure relief valves for movement together between open and closed positions.

In a further non-limiting embodiment of any of the foregoing methods, the method includes providing a seal at the outlet and preloading the seal to a closed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary methods and systems that provide a pressure relief valve that is mechanically linked to side door glass movement to reduce door closing efforts. These and other features are discussed in greater detail in the following paragraphs of this detailed description.

Figure 1A:
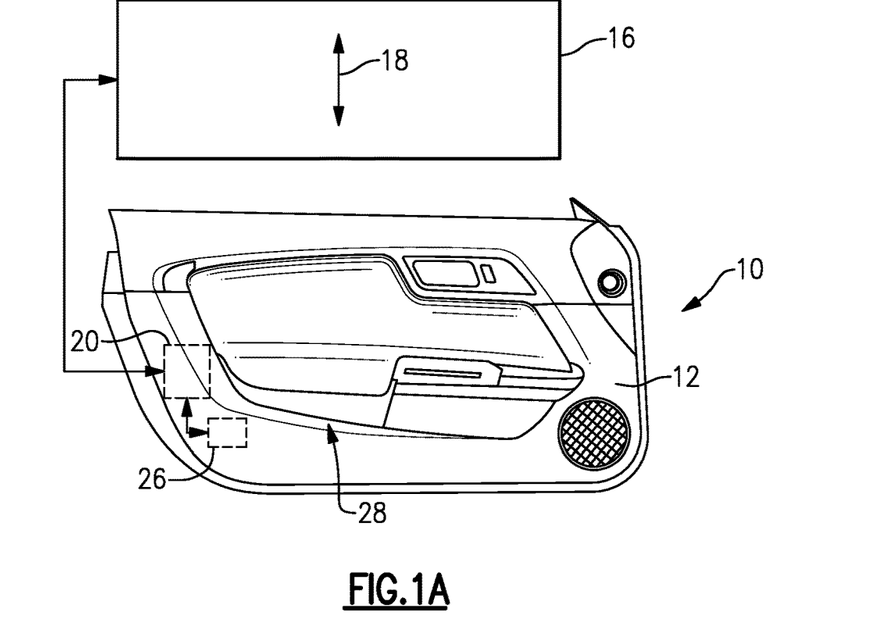
FIG. 1A is a side view of an interior side of a vehicle door with a window and a schematic representation of a window mechanism and a valve system incorporating the subject invention.

FIG. 1A shows a door 10 having an interior side 12 that faces a passenger compartment or cabin and an exterior side 14 (FIG. 1B) that faces an environment outside of a vehicle. The door 10 includes a glass panel or window 16 that is moveable in a vertical direction 18 between open and closed positions. A window mechanism 20 is coupled to the window 16 to control movement of the window 16 between the open and closed positions. Window mechanisms that lift and lower glass panels/windows are well known, and any type of window mechanism can be used to control movement of the window 16.

Figure 1B:
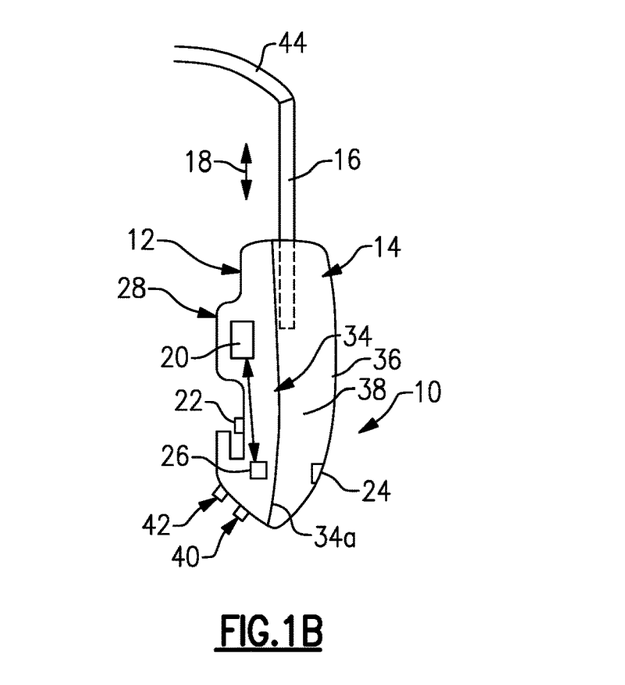
FIG. 1B is a schematic side view of the door of FIG. 1A.
Figure 2:
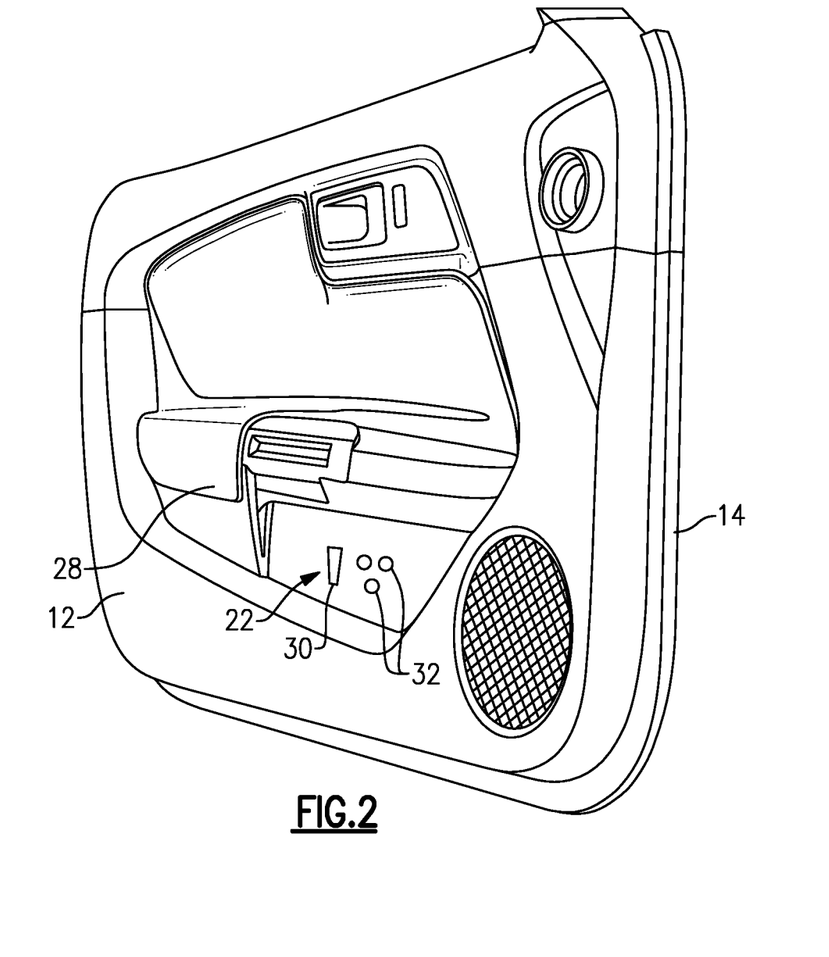
FIG. 2 is a perspective view of the door of FIG. 1.

As shown in FIG. 1B, the door 10 includes at least one inlet 22 in the interior side 12 and at least one outlet 24 in the exterior side 14. At least one pressure relief valve 26 is mechanically linked to the window 16 and/or window mechanism 20 and is in communication with the inlet 22 and outlet 24. In one example shown in FIG. 1A, the inlet 22 is added to door interior side trim 28. For example, the inlet 22 could be located inside a map pocket or on an underside of a door arm rest such that the inlet 22 is hidden from view. As shown in the example of FIG. 2, the inlet 22 can comprise one or more louvers 30 and/or vent holes 32.

The door 10 includes a vertically extending J-plane 34 (FIG. 1B) that separates the interior 12 and exterior 14 sides of the door 10. The J-plane 34 is defined at least in part by a sheet metal inner panel 34a. The inlet 22 is located internally of the J-plane 34 and the outlet 24 is located externally relative to the J-plane 34. The door trim 28 is supported by the sheet metal inner panel 34a of the J-plane 34 and a sheet metal outer panel 36 is spaced outward of the inner panel 34a to form a door cavity 38 therebetween. The window 16 is lowered into the cavity 38 outside of the J-plane 34. The door 10 also includes a primary seal 40 and a second seal 42 on the interior side 12 to seal the inside of the door 10 from external noise and elements.

The pressure relief valve 26 is located internally of the J-plane 34 and is mechanically linked for movement with the window 16 such that the pressure relief valve 26 is closed when the window 16 is closed and is opened when the window 16 begins to lower. When the pressure relief valve 26 is opened, air from inside the cabin is drawn into the inlet 22, flows through the valve 26, and exits the outlet 24. Thus, the side door glass window mechanism 20 and associated window movement is used to mechanically open and close the pressure relief valve 26 to reduce cabin pressure during door closing.

In one example, the door 10 comprises a frameless door where the window mechanism 20 automatically lowers the window down by a predetermined amount, e.g. 8.0 mm, in response to the door 10 being opened. The window mechanism 20 then raises the window 16 back up after the door 10 is closed. The window 16 is lowered automatically to prevent direct contact with a seal at a roof structure/door header 44 (FIG. 1B) during closure, as such contact may cause the glass to break.

Figure 8:
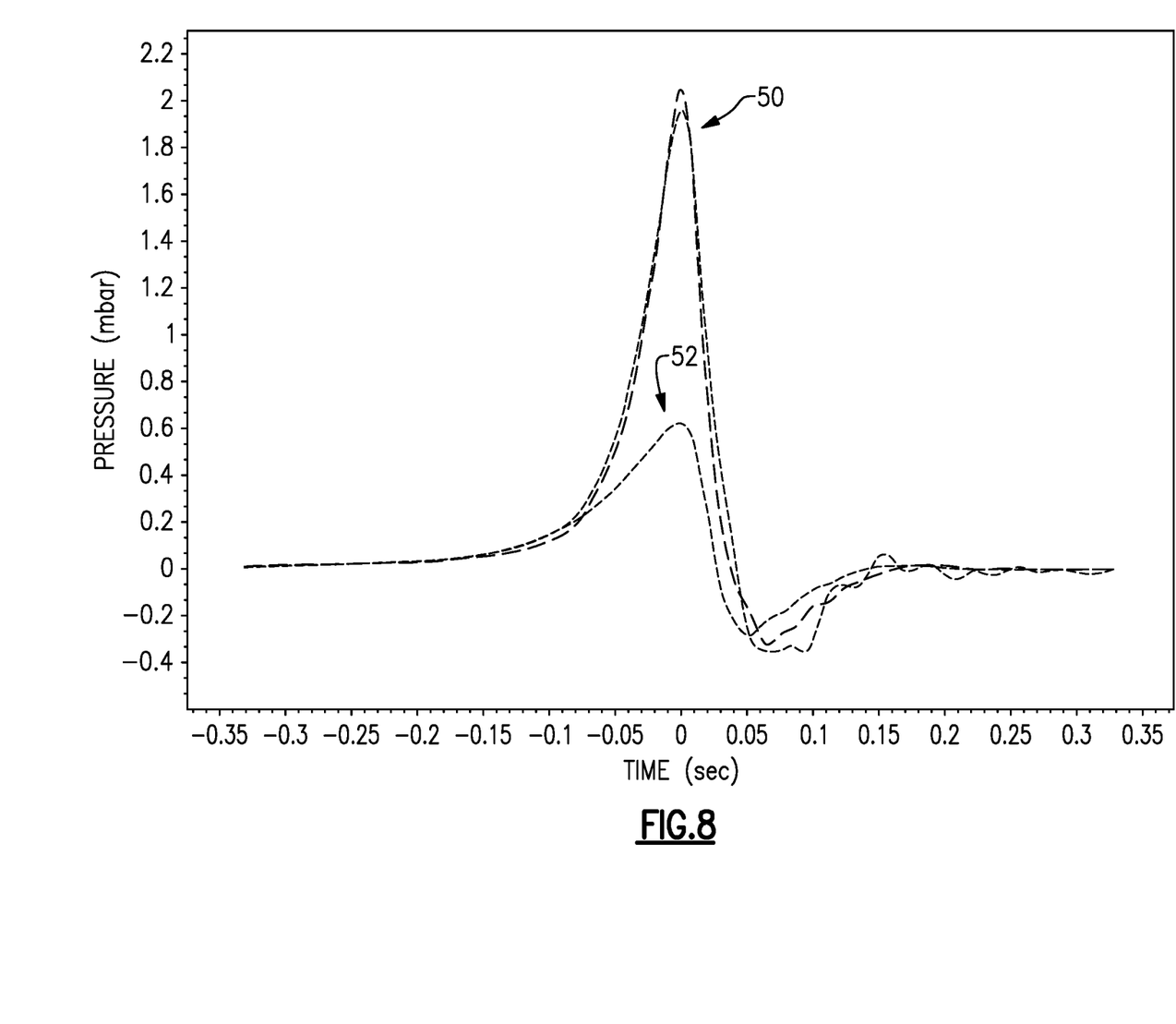
FIG. 8 is graph showing pressure changes over time during door closure.

In one example, the subject invention utilizes this movement to additionally open the pressure relief valve 26 to improve door closing efforts. This window motion can be used to mechanically open the pressure relief valve 26 with a common delay time as that used with the frameless door. In one example, a 0.25 second glass motion delay time is sufficient to alleviate the pressure spike 50 (FIG. 8) caused during door closure. The same time of 0.25 seconds would then be required to return the window 16 to the closed position once the door 10 is closed. FIG. 8 shows an example of this 0.25 second time delay where the pressure spike 50 is reduced to a much smaller spike 52 with the use of the pressure relief valve 26.

Figure 3A:
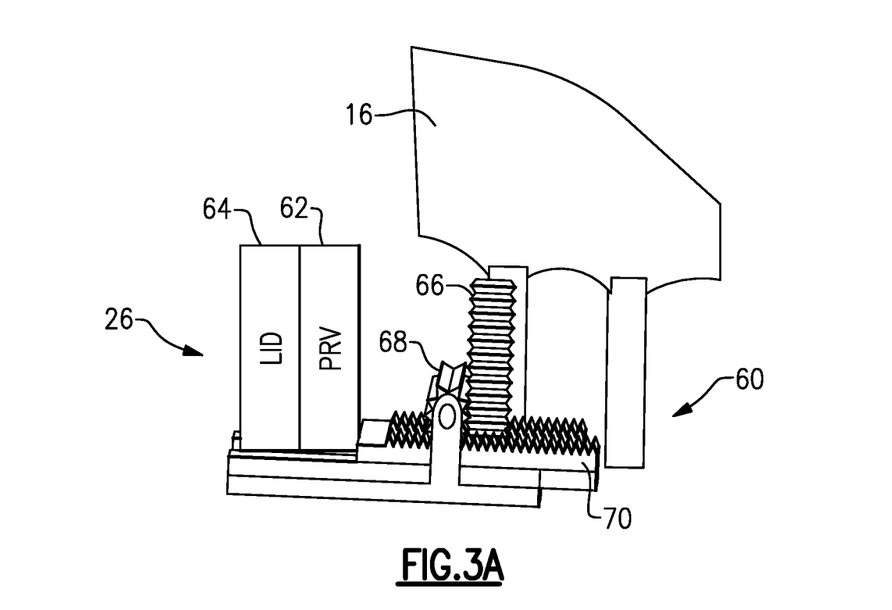
FIG. 3A is a side view of one example of a mechanical system that couples the valve system to the window and/or window mechanism and with the valve being in a closed position.
Figure 3B:
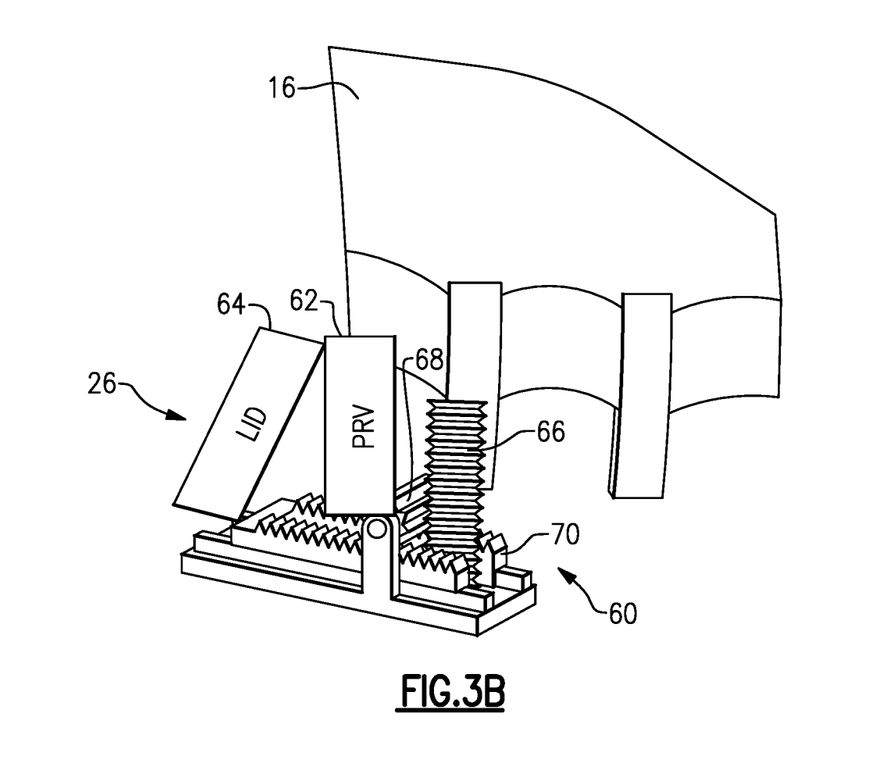
FIG. 3B is similar to FIG. 3A but shows the valve in an open position.

In one example shown in FIGS. 3A-B, a gear assembly 60 couples the window 16 and/or window mechanism 20 to the pressure relief valve 26. The pressure relief valve 26 includes a valve body 62 with a cover or lid 64 that moves relative to the valve body 62 between open (FIG. 3B) and closed (FIG. 3A) positions. Any type of pressure relief valve can be utilized in this configuration.

In this example, the gear assembly 60 includes a rod 66 with threaded teeth that is attached to the window 16 such that linear movement of the window 16 is used to move the rod 16 up and down with the window 16. Optionally, the rod 66 could be coupled to a component within the window mechanism 20 to move the rod 66 up and down. The gear assembly 60 also includes at least one pinion gear 68 that is in meshing engagement with the teeth on the rod 66 and at least one toothed lever 70 that is in meshing engagement with the pinion gear 68 and which is used to move the lid 64. When the window 16 is in the raised/closed position, the lid 64 of the pressure relief valve 26 is closed as shown in FIG. 3A. As the window 16 lowers by the predetermined amount in response to the door 10 being opened, the rod 66 drives the pinion gear 68 to rotate, which then causes the toothed lever 70 to slide, i.e. axially translate, resulting in the lever 70 moving the lid 64 to the open position as shown in FIG. 3B. The lid 64 of the valve would be configured to have enough travel to open with the travel of the predetermined amount of movement associated with opening the window 16.

When the pressure relief valve 26 is open, air flows through the inlet 22 at the door trim 28, through the valve 26, and then exits the door 10 via the outlet 24 outboard of the J-plane 34 and door seals 40, 42. Air flow out of the outlet 24 can be done with one or more louvers or vents similar to those shown for the inlet 22 as shown in FIG. 2, for example. Other options for the outlet 24 will be discussed in greater detail below.

Figure 4A:
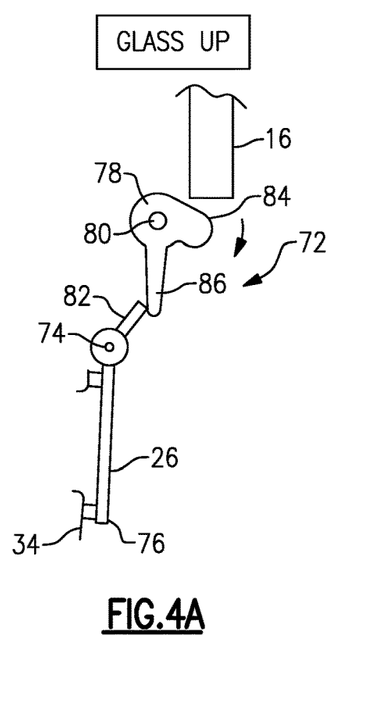
FIG. 4A is a schematic section view of a side view of another example of a mechanical system that couples the valve system to the window and/or window mechanism and with the window being in a closed position.
Figure 4B:
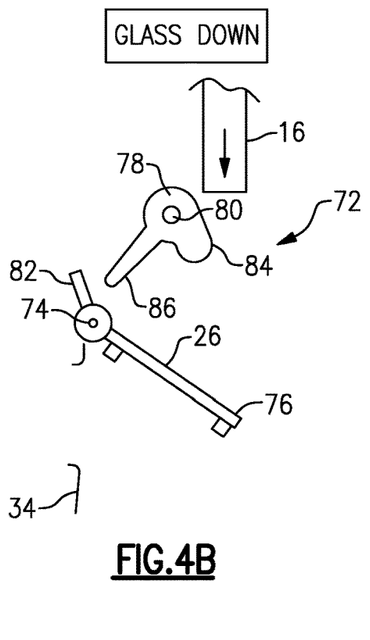
FIG. 4B is similar to FIG. 4A but shows the window moving to an open position.

In another example shown in FIGS. 4A-B, a cam assembly 72 couples the window 16 and/or window mechanism 20 to the pressure relief valve 26. FIG. 4A shows the window 16 in the raised position with the pressure relief valve 26 in a closed position. In this example, the pressure relief valve 26 comprises a body that is coupled to a pivot 74 at one end and includes a distal end 76 that moves into and out of engagement with the J-plane 34 via the cam assembly 72. The cam assembly 72 includes a cam body 78 that is pivotally mounted to a door structure as indicated at 80, and which cooperates with a toggle member 82 that pivots with the valve body about the pivot 74. The pivots 74, 80 define axes that are parallel and spaced apart from each other. The cam body 78 includes a rounded body portion that includes a cam surface 84 that engages the window 16 during movement and an extended lever portion 86 that is in engagement with the toggle member 82.

When the window 16 is lowered by the window mechanism 20 as shown in FIG. 4B, the lower edge of the window 16 slides along the cam surface 84 causing the cam body 78 and lever portion 86 to pivot about 80. This causes the lever portion 86 to pivot the toggle member 82 about pivot 74, which then moves the distal end 76 of the valve body out of contact with the J-plane 34 to open the pressure relief valve 26. In one example, the cam body 78 is coated with rubber or another similar type of material such that the window 16 can slide on the cam surface 84 with minimal noise and friction.

Figure 5:
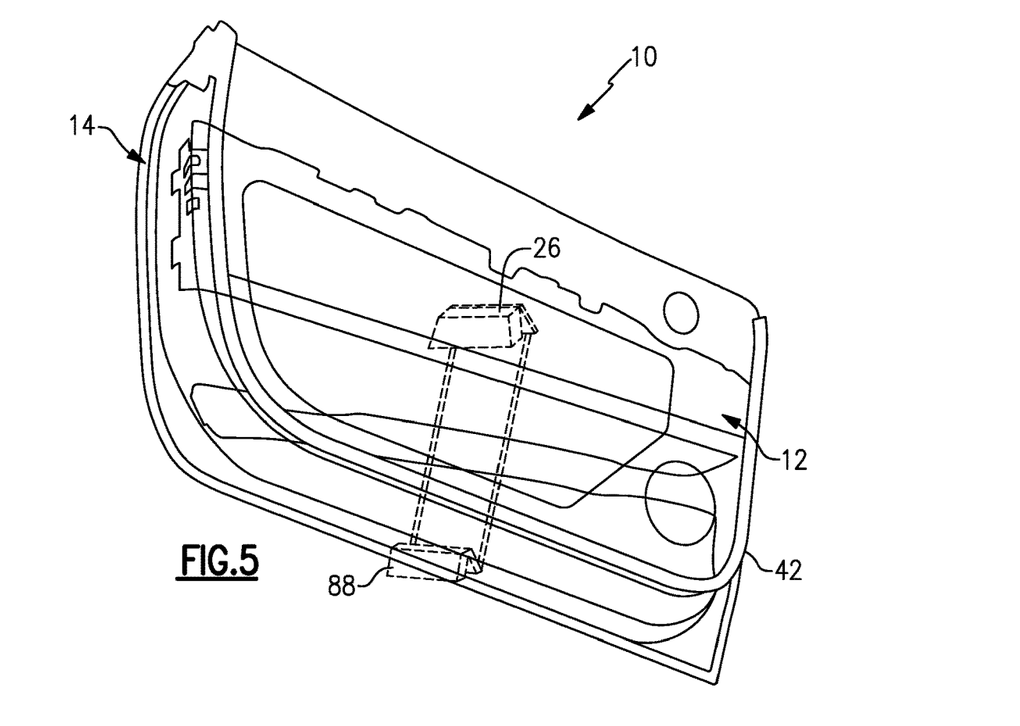
FIG. 5 is a schematic representation of a valve system that includes at least first and second pressure relief valves coupled together.

FIGS. 5 and 6A-6C show one example of an outlet configuration to be associated with the outlet 24 of the door 10. In this example, the internal pressure relief valve 26 comprises a first pressure relief valve and the system includes a second pressure relief valve 88 that is mechanically coupled or linked to the first pressure relief valve 26. As shown in FIG. 5, the first pressure relief valve 26 is located inside the J-plane 34 and the second pressure relief valve 88 is located outside the J-plane 34. In this example, the pressure relief valves 26, 88 include the valve body 62 and the lid 64 that moves relative to the body 62 to open and close the valves 26, 88. In one example, the lids 64 are connected/linked to each other with one or more connection rods/links 90. As such, when the first pressure relief valve 26 is opened the second pressure relief valve 26 is simultaneously opened.

Figures 6A, 6B:
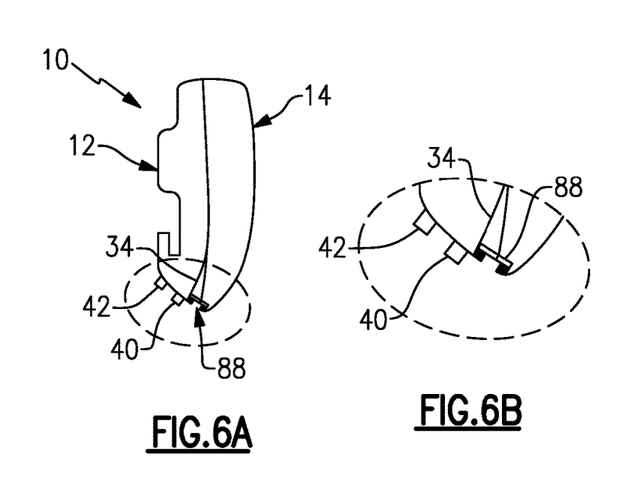
FIG. 6A is a side schematic view of the door including the valves of FIG. 5.
FIG. 6B is a view similar to FIG. 6A and shows the valves linked together and in the closed position.
Figure 6C:
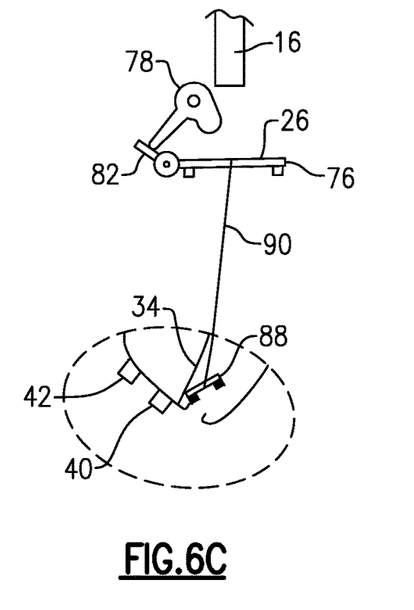
FIG. 6C is a view similar to FIG. 6B but showing the valves linked together and in the open position.

FIG. 6A shows the second pressure relief valve 88 in relation to the J-plane 34. FIG. 6B shows the second pressure relief valve 88 in the closed position. FIG. 6C shows the first pressure relief valve 26 in the open position with the link 90 coupling the first pressure relief valve 26 and second pressure relief valve 88 together to simultaneously move the second pressure relief valve 88 to the open position in response to movement of the first pressure relief valve 26. The second pressure relief valve 88 can be used to provide a sealing function at the outlet 24 such that vehicle dynamic concerns, such as water management, noise, etc. for example, could be addressed. Insulating material could also be included in the second pressure relief valve 88 to further reduce noise from traveling through the valve 88 and into the cabin.

Figure 7:
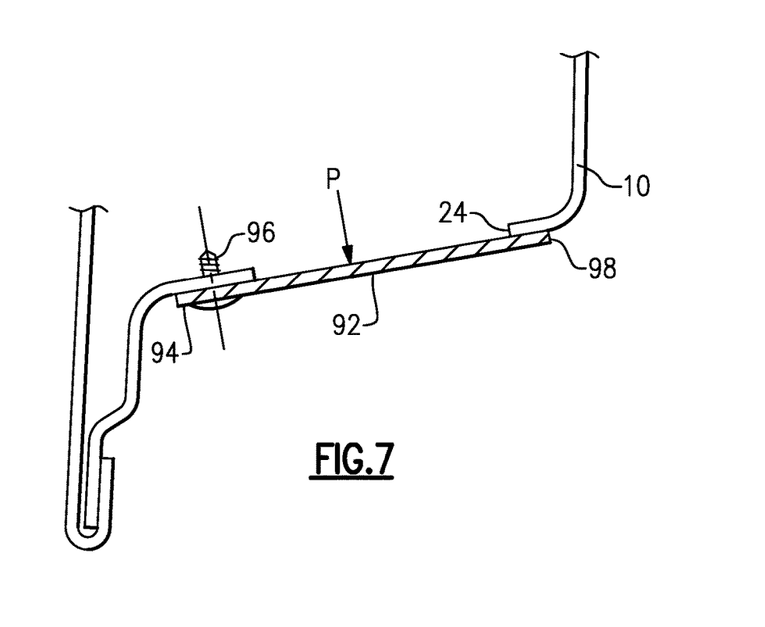
FIG. 7 is a schematic representation of a seal located at a door outlet.

FIG. 7 shows another example of an outlet configuration to be associated with the outlet 24 of the door 10. In this example, a seal 92 is positioned at the outlet 24. The seal 92 comprises a flap that has one end 94 fixed to the door 10 with at least one fastener 96 and which extends to a distal end 98 that can move out of contact with the door 10. The seal 92 is preloaded to be in the closed position with the distal end 98 moving to an open position when pressure P applied against the seal 92 reaches a specified level. When the pressure is relieved, the seal 92 returns to the closed position. This is just one example of a sealing configuration. Other types of seals could also be used at the outlet 24.

The subject invention allows for a more efficient package design as extractor size could be reduced, or a fascia could be moved closer to a body side of the door, which reduces air flow out of the extractor. The use of traditional rear air extractors is not eliminated as air flow is required to avoid fogging of the windows; however, only 60% of extractor capacity is required for climate purposes while 100% is required for door closure efforts. In some cases, using the subject invention will allow for a 40% reduction in rear extractor capacity. This would also facilitate reducing NVH content. Also, sound absorbers can be optionally added to reduce noise when the pressure relief valve(s) are closed. The device is only open when the door opens and thus would not transmit noise into the cabin while driving.

Additionally, air leakage will not be impacted as the pressure relief valve is sealed when the door is closed as opposed to traditional air extractors. Further, when the window is lowered during door closure, side door glass clearance zones could be reduced as the window will only be present in static events and not dynamic events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system, comprising:
a door having interior and exterior sides;
at least one inlet in the interior side and at least one outlet in the exterior side;
a window mechanism to move a window relative to the door; and
at least one pressure relief valve in communication with the inlet and outlet, and being mechanically linked for movement with the window.

2. The system according to claim 1, wherein the pressure relief valve is closed when the window is closed and is opened when the window begins to open to allow air to flow from the inlet to the outlet.

3. The system according to claim 2, wherein the window mechanism automatically lowers the window by a predetermined amount in response to the door being opened.

4. The system according to claim 3, wherein the window mechanism closes the window once the door is closed and the pressure relief valve returns to a closed position.

5. The system according to claim 2, including a gear assembly that couples the window mechanism and/or window to the pressure relief valve.

6. The system according to claim 2, including a cam assembly that couples the window mechanism and/or window to the pressure relief valve.

7. The system according to claim 1, wherein the at least one inlet comprises at least one louver or vent hole located in door trim on the interior side.

8. The system according to claim 1, including a vertically extending J-plane separating the interior and exterior sides, and wherein the inlet is located internally and the outlet is located externally relative to the J-plane.

9. The system according to claim 8, wherein the pressure relief valve is located internally relative to the J-plane.

10. The system according to claim 9, wherein the pressure relief valve comprises a first pressure relief valve and including at least one second pressure relief valve located externally relative to the J-plane and associated with the outlet.

11. The system according to claim 10, wherein the second pressure relief valve is mechanically coupled to the first pressure relief valve.

12. The system according to claim 1, including a seal associated with the outlet.

13. The system according to claim 12, wherein the seal is preloaded to a closed position and moves to an open position in response to an increase in air pressure exiting the pressure relief valve.

14. The system according to claim 1, wherein the at least one pressure relief valve comprises at least a first pressure relief valve associated with the inlet and a second pressure relief valve associated with the outlet, the first and second pressure relief valves being mechanically linked for movement together between open and closed positions.

15. A method, comprising:
providing a door having interior and exterior sides, a window mechanism to move a window relative to the door, and at least one inlet in the interior side and at least one outlet in the exterior side; and
mechanically linking at least one pressure relief valve for movement with the window such that the pressure relief valve opens in response to the window beginning to open.

16. The method according to claim 15, including automatically lowering the window via the window mechanism by a predetermined amount in response to the door being opened which correspondingly opens the pressure relief valve to allow air to flow from the inlet to the outlet.

17. The method according to claim 16, including closing the window via the window mechanism once the door is closed resulting in the pressure relief valve returning to a closed position.

18. The method according to claim 17, including coupling the pressure relief valve to the window mechanism and/or window with a gear or cam assembly.

19. The method according to claim 17, wherein the at least one pressure relief valve comprises at least a first pressure relief valve and a second pressure relief valve, and including associating the first pressure relief valve with the inlet, associating the second pressure relief valve with the outlet, and mechanically linking the first and second pressure relief valves for movement together between open and closed positions.

20. The method according to claim 17, including providing a seal at the outlet and preloading the seal to a closed position.

21. The method according to claim 15, including forming the door as a panel structure that receives the window as the window is opened, and fixing the at least one inlet and the at least one outlet within the panel structure.

22. The system according to claim 1, wherein the door is formed as a panel structure that receives the window as the window is opened, and wherein the at least one inlet and the at least one outlet are fixed within the panel structure.

* * * * *